(12) United States Patent
Kishima

(10) Patent No.: US 7,526,170 B2
(45) Date of Patent: Apr. 28, 2009

(54) OPTICAL SEMICONDUCTOR DEVICE

(75) Inventor: Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/858,519

(22) Filed: Sep. 20, 2007

(65) Prior Publication Data

US 2008/0085075 A1 Apr. 10, 2008

(30) Foreign Application Priority Data

Oct. 6, 2006 (JP) ............................. 2006-274752

(51) Int. Cl.
*G02B 6/10* (2006.01)
(52) U.S. Cl. ..................................... 385/129
(58) Field of Classification Search ................ 385/129, 385/130, 132; 438/387
See application file for complete search history.

(56) References Cited

U.S. PATENT DOCUMENTS

| 4,518,219 | A | * | 5/1985 | Leonberger et al. | ......... 385/132 |
| 5,926,717 | A | * | 7/1999 | Michael et al. | ............. 438/387 |
| 6,801,702 | B2 | | 10/2004 | Day | |
| 6,834,152 | B2 | * | 12/2004 | Gunn et al. | ................. 385/130 |

FOREIGN PATENT DOCUMENTS

| JP | 63-147111 | 6/1988 |
| JP | 09-005546 | 1/1997 |
| JP | 09-318830 | 12/1997 |
| JP | 10-332965 | 12/1998 |
| JP | 11-344630 | 12/1999 |
| JP | 2004-506935 | 3/2004 |
| JP | 2005-182030 | 7/2005 |

OTHER PUBLICATIONS

Tejaswi Indukuri et al.; Three-dimensional integration of metal-oxide-semiconductor transistor with subterranean photonics in silicon; Applied Physics Letters; vol. 83, No. 24, p. 4909-4911.
Prkash Koonath et al.; Sculpting of three-dimensional nano-optical structures in silicon; Applied Physics Letters, vol. 88 121108-1-3.
Japanese Office Action dated Aug. 26, 2008 for Application No. 2006-274752.
Tejaswi Indukuri "Three-Dimensional Integration of Metal-Oxide-Semiconductor Transistor with Subterranean Photonics in Silicon", Applied Physics Letters 88, pp. 2-4, Mar. 21, 2006.
Prakash Koonath "Sculpting of Three-Dimensional Nano-Optical Structures in Silicon", Applied Physics vol. 83, No. 24, pp. 2-4, Dec. 15, 2003.

* cited by examiner

*Primary Examiner*—Frank G Font
*Assistant Examiner*—Robert Tavlykaev
(74) *Attorney, Agent, or Firm*—Sonnenschein Nath & Rosenthal LLP

(57) ABSTRACT

An optical waveguide device is disclosed which includes a semiconductor region, an optical waveguide provided between a first light confinement layer and a second light confinement layer formed in the semiconductor region, and at least one insulating film region formed in the semiconductor region and above at least one of an outside and an inside with respect to a curvature radius direction of the bent portion of the optical waveguide, wherein; the insulating film region is also used as an isolation region of a MOS device to be formed in the semiconductor region in which the insulating film region is formed.

3 Claims, 8 Drawing Sheets

(STRUCTURE A)

(UNIT: μm)

(STRUCTURE B)

(STRUCTURE C)

(STRUCTURE D)

(STRUCTURE E)

(STRUCTURE F)

OPTICAL SEMICONDUCTOR DEVICE

CROSS REFERENCES TO RELATED APPLICATIONS

The present invention contains subject matter related to Japanese Patent Application JP 2006-274752 filed in the Japanese Patent Office on Oct. 6, 2006, the entire contents of which are incorporated herein by reference.

BACKGROUND OF THE INVENTION

1. Field of the Invention

The present invention relates to an optical semiconductor device having an optical waveguide which decreases a waveguide loss at a bent portion thereof.

2. Description of the Related Art

There has been a method for forming an optical waveguide immediately under the surface of a silicon substrate by a SIMOX (Separation by Implanted Oxygen) method. This method is characterized in that a portion to be used as an optical waveguide can be formed inside a single crystalline silicon material while the surface thereof is allowed to remain in a flat state (for example, see Prakash Koonath, Koichiro Kisima, Tejaswi Indukuri, and Bahram Jalali "Sculpting of three-dimensional nano-optical structures in silicon" Applied Physics Letters Vol. 83, No. 24, pp. 4904 to 4911, Dec. 15, 2003). Hence, this method has particularly drawn attention since an optical integrated circuit and an electrical integrated circuit can be integrated in a three-dimensional manner in one silicon substrate.

As one structural example of an optical waveguide formed by an SIMOX method, as shown in FIG. 12, the structure is formed in which a silicon layer 113 is formed on a silicon substrate 111 with a first silicon oxide layer 112 interposed therebetween, and a second silicon oxide layer 114 is formed in this silicon layer 113. This silicon layer 113 between the first silicon oxide layer 112 and the second silicon oxide layer 114 is a first silicon layer 115 forming an optical waveguide, and a part of the first silicon layer 115 having a large thickness, that is, a part of the first silicon layer 115 at which a part of the first silicon oxide layer 112 is formed to protrude to the silicon substrate 111 side, is to be used as an optical waveguide 121. In this case, the second silicon oxide layer 114 is formed to have two flat surfaces. In addition, a part of the silicon layer 113 on the second silicon oxide layer 114 is a second silicon layer 116. In order to form the structure described above, after a mask (not shown), which has an opening in a region in which the above optical waveguide 121 is to be formed, is formed on the silicon substrate 111, for example, oxygen is ion-implanted to form the first silicon oxide layer 112, and after the above mask is removed, for example, oxygen is further ion-implanted, thereby forming the second silicon oxide layer 114. Accordingly, the optical waveguide 121 is formed from the first silicon layer 115 so as to have a ridge shape.

In addition, as shown in FIG. 13, the silicon layer 113 is formed on the silicon substrate 111 with the first silicon oxide layer 112 interposed therebetween. In this silicon layer 113, the second silicon oxide layer 114 is formed, and a part of the silicon layer 113 (first silicon layer 115) provided between the first silicon oxide layer 112 and the second silicon oxide layer 114, which is a region to be formed into the optical waveguide 121, is formed to have a thickness larger than that of the other region. In addition, a part of the silicon layer 113 on the second silicon oxide layer 114 is the second silicon layer 116. Accordingly, since the first silicon layer 115 and the second silicon layer 116 are formed from the same layer, after a mask (not shown) is formed on this silicon layer 113 in a region in which the above optical waveguide is to be formed, for example, when oxygen is ion-implanted, the second silicon layer 116 is formed, and the optical waveguide 121 is formed from the first silicon layer 115 to have a ridge shape. That is, when oxygen is ion-implanted in the silicon layer 113 of an SOI (silicon on insulator) substrate, the optical waveguide 121 having the above structure can be formed.

In recent years, proposals have been made to form a MOS device on the surface of a silicon substrate having an optical waveguide therein which is formed by an SIMOX method or the like (for example, see Tejaswi Indukuri, Prakash Koonath, and Bahram Jalali "Three-dimensional Integration of metal-oxide-semiconductor transistor with subterranean photonics in silicon" Applied Physics Letters Vol. 88, 121108-1-3, 2006). As the optical waveguide formed inside a silicon substrate by this SIMOX method, a ridge-type optical waveguide has been reported. However, since a ridge-type optical waveguide generally has not strong light confinement, when it is compared with a strip-type optical waveguide, an optical waveguide loss is disadvantageously increased when the optical waveguide is bent.

SUMMARY OF THE INVENTION

The problem to be solved by the present invention is that since a ridge-type optical waveguide generally has not strong light confinement, when it is compared with a strip-type optical waveguide, an optical waveguide loss is disadvantageously increased when the optical waveguide is bent.

Accordingly, it is desirable to decrease the optical waveguide loss at a bent portion of an optical waveguide.

An optical semiconductor device according to an embodiment of the present invention, includes: a semiconductor region; an optical waveguide provided between a first light confinement layer and a second light confinement layer which are formed in the semiconductor region; and at least one insulating film region formed in the semiconductor region and above at least one of an outside and an inside with respect to a central part of a bent portion of the optical waveguide.

In the optical semiconductor device described above, since at least one insulating film region is formed in the semiconductor region and above at least one of the outside and the inside with respect to the central part of the bent portion of the optical waveguide, the waveguide loss at the bent portion of the optical waveguide is decreased. The reason for this is believed that the insulating film region enables light which is guided in the optical waveguide and which is to be emitted outside at the bent portion of the optical waveguide to return to the inside thereof.

According to the optical semiconductor device of the embodiment of the present invention, since the waveguide loss at the bent portion of the optical waveguide can be decreased, the waveguide efficiency of light can be increased, and as a result, an optical semiconductor device having a high-performance optical waveguide can be advantageously provided.

DESCRIPTION OF THE PREFERRED EMBODIMENTS

An optical semiconductor device 1 according to one embodiment (first example) of the present invention will be described with reference to a schematic cross-sectional structural view of FIG. 1 and a plan layout view of FIG. 2.

Figure 1:
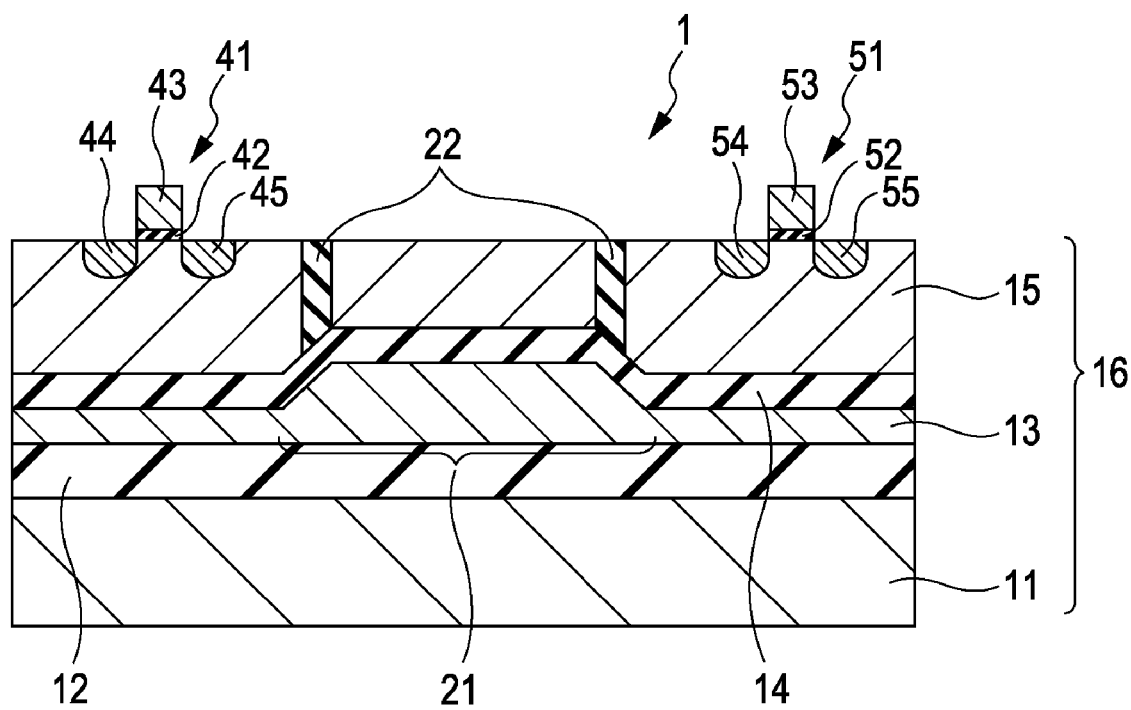
FIG. 1 is a schematic cross-sectional structural view of an optical semiconductor device according to an embodiment (first example) of the present invention.

As shown in FIG. 1, there are provided a semiconductor substrate 11, a first semiconductor layer 13 which is formed on the semiconductor substrate 11 with a first light confinement layer 12 interposed therebetween so that a region to be used as an optical waveguide 21 has a thickness larger than that of the other region, and a second semiconductor layer 15 formed on the first semiconductor layer 13 with a second light confinement layer 14 interposed therebetween. As the semiconductor substrate 11, for example, a silicon substrate is used. In addition, the first light confinement layer 12 and the second light confinement layer 14 are formed of an insulating film having a refractive index lower than that of the semiconductor layer described above and are formed, for example, of a silicon oxide film. In addition, the first light confinement layer 12 is formed so as to be flat at the first semiconductor layer 13 side, and the second light confinement layer 14 is formed to protrude to the second semiconductor layer 15 side so that a portion of the first semiconductor layer 13 to be used as the optical waveguide 21 has a large thickness. In addition, for the first semiconductor layer 13 and the second semiconductor layer 15, silicon layers are used.

That is, the semiconductor substrate 11, the first semiconductor layer 13, and the second semiconductor layer 15 form a semiconductor region 16. In addition, the first semiconductor layer 13 and the second semiconductor layer 15 are formed from the same semiconductor layer, and in this semiconductor layer, the second light confinement layer 14 is formed from silicon oxide, for example, by an SIMOX method, such as ion implantation of oxygen. Furthermore, the above optical waveguide 21 is a ridge-type optical waveguide.

Figure 2:
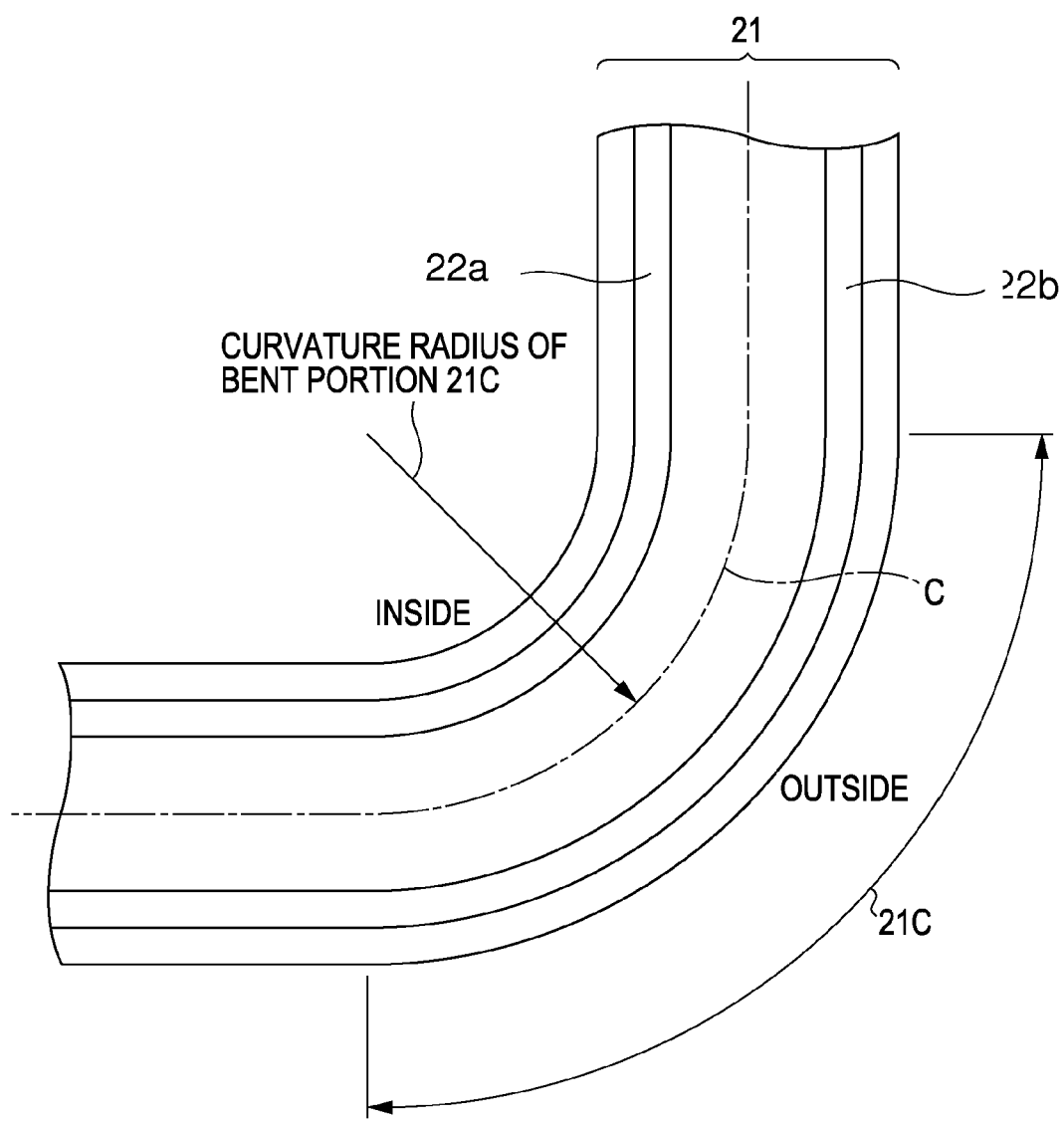
FIG. 2 is a layout view of the optical semiconductor device according to the embodiment (first example) of the present invention.

As shown in FIG. 2, the optical waveguide 21 described above is formed in a desired path, and at a bent portion 21C of the optical waveguide in the path, at least one insulating film region 22 is formed in the semiconductor region 16 (second silicon layer 15) and above at least one of an outside and an inside with respect to a central part (central line C) of the bent portion 21C along the optical waveguide 21. In this first example, the insulating film regions 22 (22a, 22b) are formed in the semiconductor region 16 (second silicon layer 15) on the second light confinement layer 14 and above inclined side walls of the optical waveguide 21 located at two sides thereof so as to be along the two sides of the optical waveguide 21.

In addition, as shown in FIG. 1, in the second semiconductor layer 15, at least one MOS device may be formed. For example, MOS transistors 41 and 51 are formed. In the MOS transistor 41, for example, a gate electrode 43 is formed on the second semiconductor layer 15 via a gate insulating film 42, and source/drain 44, 45 are formed in the second semiconductor layer 15 at two sides of the gate electrode 43. In a manner similar to that described above, in the MOS transistor 51, for example, a gate electrode 53 is formed on the second semiconductor layer 15 via a gate insulating film 52, and source/drain 54, 55 are formed in the second semiconductor layer 15 at two sides of the gate electrode 53. In addition, between the MOS transistors 41 and 51, in order to reduce electrical interference, an isolation region is generally formed for electrical isolation; however, in this case, the insulating film region 22 can also be used as this isolation region, and this insulating film region 22 can be formed by a shallow trench isolation (hereinafter referred to as "STI" in some cases) method which is a general element isolation technique for MOS transistors.

For example, after a common resist film is formed on the second semiconductor layer 15 in which the insulating film region 22 is to be formed, an etching mask having an opening in a region in which the insulating film region 22 is to be formed is formed by patterning the resist film using a lithography technique, and by using this etching mask, the second semiconductor layer 15 is etched to the second light confinement layer 14 to form a groove. After an insulating film is filled in this grove, an excess insulating film formed on the second semiconductor layer 15 is removed by polishing, such as chemical mechanical polishing. Accordingly, the insulating film region 22 extending to the second light confinement layer 14 is formed in the second semiconductor layer 15.

In the optical semiconductor device 1, since the insulating film region 22 is provided in the semiconductor region 16 (second silicon layer 15) and above at least one of an outer side and an inner side of the bent portion 21C with respect to the curvature radius direction of the bent portion 21C of the optical waveguide 21, the waveguide loss at the bent portion 21C of the optical waveguide 21 is decreased. The reason for this is believed that the insulating film region 22 enables light which is guided in the optical waveguide 21 and which is to be emitted outside at the bent portion 21C of the optical waveguide 21 to return to the inside thereof. Accordingly, since the waveguide loss at the bent portion 21C of the optical waveguide can be decreased, the waveguide efficiency of light can be increased, and as a result, the optical semiconductor device 1 having a high-performance optical waveguide 21 can be advantageously provided. In addition, in the above structure, although the insulating film regions 22 are provided above the two side walls of the optical waveguide 21, when the insulating film region 22 is formed only above one side wall, the effect can also be obtained.

Next, an optical semiconductor device 2 according to one embodiment (second example) of the present invention will be described with reference to a schematic cross-sectional structural view of FIG. 3. In this example, the same reference numerals as those in the first example designate the same or corresponding constituent elements.

Figure 3:
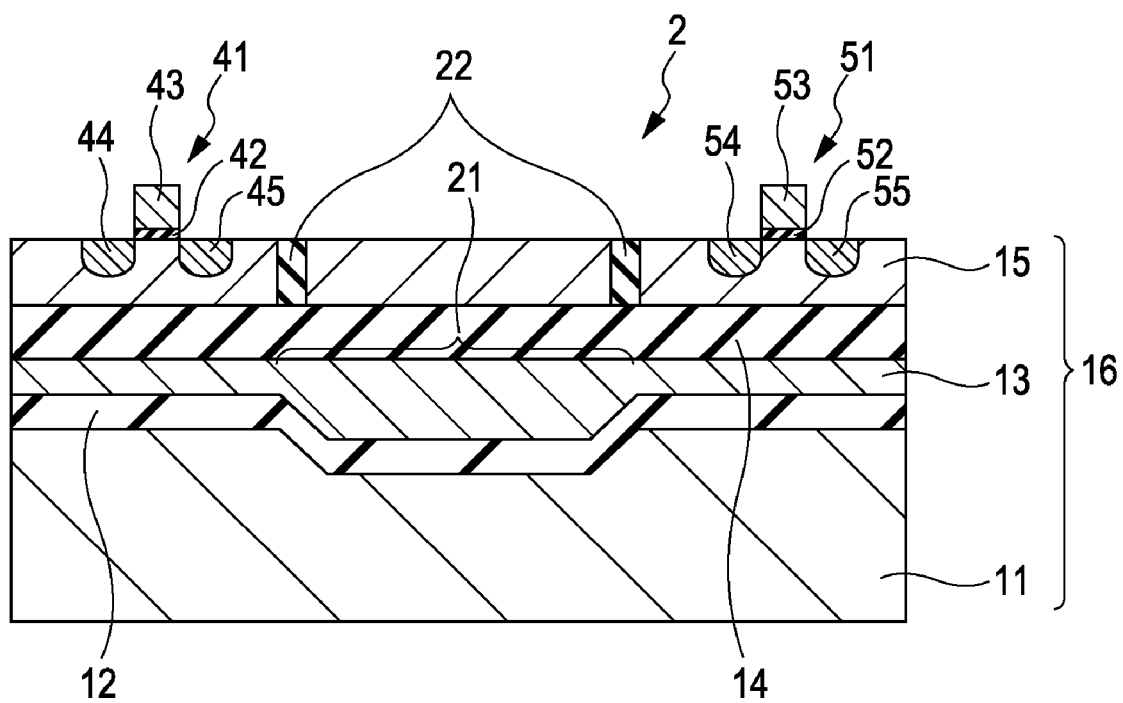
FIG. 3 is a schematic cross-sectional structural view of an optical semiconductor device according to an embodiment (second example) of the present invention.

As shown in FIG. 3, there are provided the semiconductor substrate 11, the first semiconductor layer 13 which is formed on the semiconductor substrate 11 with the first light confinement layer 12 interposed therebetween so that a region to be used as the optical waveguide 21 has a thickness larger than that of the other region, and the second semiconductor layer 15 formed on the first semiconductor layer 13 with the second light confinement layer 14 interposed therebetween. As the semiconductor substrate 11, for example, a silicon substrate is used. In addition, the first light confinement layer 12 and the second light confinement layer 14 are formed of an insulating film having a refractive index lower than that of the semiconductor layer described above and are formed, for example, of a silicon oxide film. In addition, the first light confinement layer 12 is formed to protrude to the semiconductor substrate 11 side so that a portion of the first semiconductor layer 13 to be used as the optical waveguide 21 has a large thickness. In addition, the second light confinement layer 14 is formed so as to be flat at the first semiconductor layer 13 side. For the first semiconductor layer 13 and the second semiconductor layer 15, silicon layers are used.

That is, the semiconductor substrate 11, the first semiconductor layer 13, and the second semiconductor layer 15 form the semiconductor region 16. In addition, the first light confinement layer 12 is formed from silicon oxide, for example, by an SIMOX method, such as ion implantation of oxygen into the semiconductor substrate 11. Furthermore, the above optical waveguide 21 is a ridge-type optical waveguide.

The optical waveguide 21 described above is formed in a desired path, and as is the case described with reference to the above FIG. 2, at the bent portion 21C of the optical waveguide in the path, the insulating film region 22 is formed in the semiconductor region 16 (second silicon layer 15) and above at least one of the outer side and the inner side of the bent portion with respect to the curvature radius direction thereof so as to be along the optical waveguide 21. In this second example, the insulating film regions 22 (22a, 22b) are formed in the semiconductor region 16 (second silicon layer 15) on the second light confinement layer 14 and above the inclined side walls of the optical waveguide 21 located at two sides thereof so as to be along the two sides thereof.

In the second semiconductor layer 15, at least one MOS device may be formed. For example, the MOS transistors 41 and 51 are formed. In the MOS transistor 41, for example, the gate electrode 43 is formed on the second semiconductor layer 15 via the gate insulating film 42, and the source/drain 44, 45 are formed in the second semiconductor layer 15 at two sides of the gate electrode 43. In a manner similar to that described above, in the MOS transistor 51, for example, the gate electrode 53 is formed on the second semiconductor layer 15 via the gate insulating film 52, and the source/drain 54, 55 are formed in the second semiconductor layer 15 at two sides of the gate electrode 53. In addition, between the MOS transistors 41 and 51, in order to reduce the electrical interference, an isolation region is generally formed for electrical isolation; however, in this case, the insulating film region 22 can also be used as this isolation region, and this insulating film region 22 can be formed by an STI method which is a general element isolation technique for MOS transistors.

In the optical semiconductor device 2, as is the optical semiconductor device 1, since the insulating film region 22 is provided in the semiconductor region 16 (second silicon layer 15) and above at least one of the outer side and the inner side of the bent portion 21C with respect to the curvature radius direction thereof along the optical waveguide 21, the waveguide loss at the bent portion 21C of the optical waveguide 21 is decreased. The reason for this is believed that the insulating film region 22 enables light which is guided in the optical waveguide 21 and which is to be emitted outside at the bent portion 21C of the optical waveguide 21 to return to the inside thereof. Accordingly, since the waveguide loss at the bent portion 21C of the optical waveguide can be decreased, the waveguide efficiency of light can be increased, and as a result, the optical semiconductor device 2 having a high-performance optical waveguide 21 can be advantageously provided. In addition, in the structure described above, although the insulating film regions 22 are provided above the two side walls of the optical waveguide 21, when the insulating film region 22 is formed only above one side wall, the effect can also be obtained.

Next, an optical semiconductor device according to one embodiment (third example) of the present invention will be described with reference to a schematic cross-sectional structural view of FIG. 4, and an optical semiconductor device according to one embodiment (fourth example) of the present invention will be described with reference to a schematic cross-sectional structural view of FIG. 5.

Figure 4:
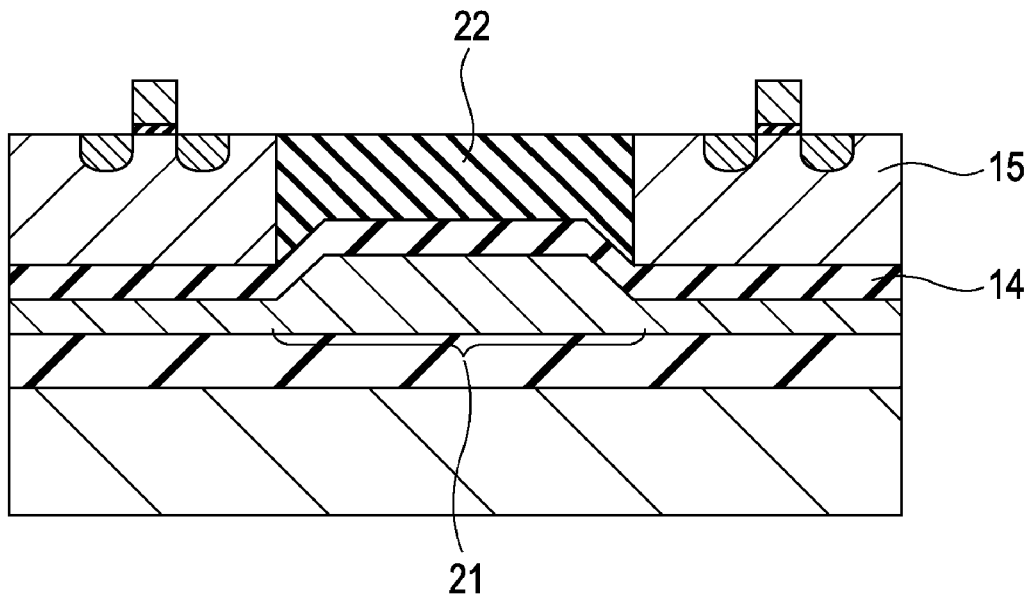
FIG. 4 is a schematic cross-sectional structural view of an optical semiconductor device according to an embodiment (third example) of the present invention.

As shown in FIG. 4, the structure other than the insulating film region 22 is similar to that described with reference to FIG. 1. Hence, in this embodiment, the insulating film region 22 will be described. From a layout point of view, the insulating film region 22 is formed in the second semiconductor layer 15 on the second light confinement layer 14 so as to be overlapped with the optical waveguide 21 including the side portions thereof. Also in this structure, the waveguide loss at the bent portion 21C (see the above FIG. 2) of the optical waveguide 21 can be decreased, and hence the waveguide efficiency of light can be increased.

Figure 5:
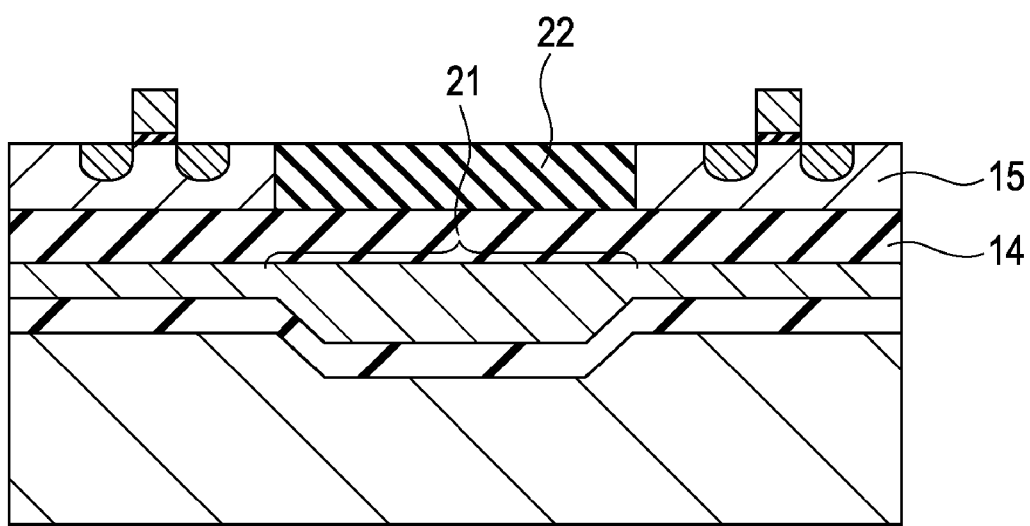
FIG. 5 is a schematic cross-sectional structural view of an optical semiconductor device according to an embodiment (fourth example) of the present invention.

In addition, as shown in FIG. 5, the structure other than the insulating film region 22 is similar to that described with reference to FIG. 3. Hence, in this embodiment, the insulating film region 22 will be described. From a layout point of view, the insulating film region 22 is formed in the second semiconductor layer 15 on the second light confinement layer 14 so as to be overlapped with the optical waveguide 21 including the side portions thereof. Also in this structure, the waveguide loss at the bent portion 21C (see the above FIG. 2) of the optical waveguide 21 can be decreased, and hence the waveguide efficiency of light can be increased.

Next, the light waveguide losses of the structures of the optical semiconductor devices according to the embodiments of the present invention were measured by simulations, and the results will be described.

The simulations were each performed using a model having a simplified structure. The basic structure will be described with reference to a schematic cross-sectional structural view of FIG. 6. This structure was a structure having no insulating film region 22 and was called a structure A.

Figure 6:
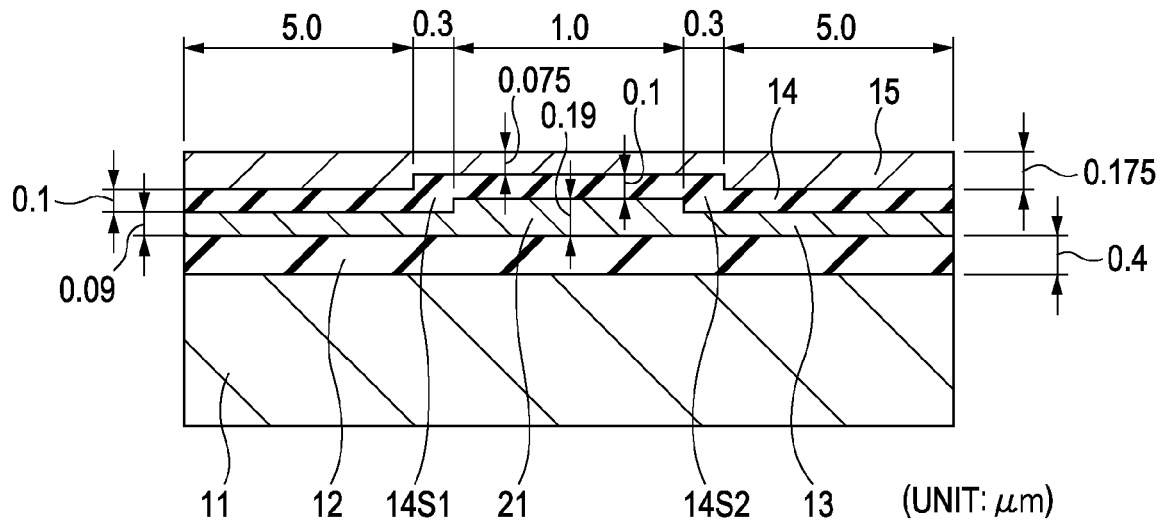
FIG. 6 is a schematic cross-sectional structural view of a structure A (basic structure) for a simulation.

As shown in FIG. 6, there were provided the semiconductor substrate 11, the first semiconductor layer 13 which was formed on the semiconductor substrate 11 with the first light confinement layer 12 interposed therebetween so that a region to be used as the optical waveguide 21 had a thickness larger than that of the other region, and the second semiconductor layer 15 formed on the first semiconductor layer 13 with the second light confinement layer 14 interposed therebetween. As the semiconductor substrate 11, a silicon substrate was used, and as the first light confinement layer 12 and the second light confinement layer 14, silicon oxide films were used. In addition, the first semiconductor layer 13 and the second semiconductor layer 15 were each formed of a silicon layer. In addition, the first light confinement layer 12 was formed to be flat at the first semiconductor layer 13 side, and the second light confinement layer 14 was formed to protrude to the second semiconductor layer 15 side so that a portion of the first semiconductor layer 13 to be used as the optical waveguide 21 had a large thickness. In addition, in order to simplify the calculation, the optical waveguide 21 was formed to have a rectangular cross-sectional shape.

The dimensions of the individual portions were as follows, that is, the thickness of the first light confinement layer 12 was 0.4 μm, the thickness of the first semiconductor layer 13 was 0.09 μm, and the thickness of the portion corresponding to the optical waveguide 21 was 0.19 μm. In addition, the thickness of the second light confinement layer 14 was set to 0.1 μm, the thickness of the second semiconductor layer 15 was set to 0.175 μm, and the thickness thereof above optical waveguide 21 was set to 0.075 μm. Furthermore, the width of the optical waveguide 21 was set to 1.0 μm, the widths of step-forming portions 14S1 and 14S2 of the second light confinement layer 14 located at the two sides of the optical waveguide 21 were each set to 0.3 μm, and the widths of parts of the second light confinement layer 14 located outside the above two sides were each set to 5.0 μm.

In addition to the above basic structure described above, structures including the insulating film region 22 will be described with reference to schematic cross-sectional structural views of FIGS. 7 to 12.

Figure 7:
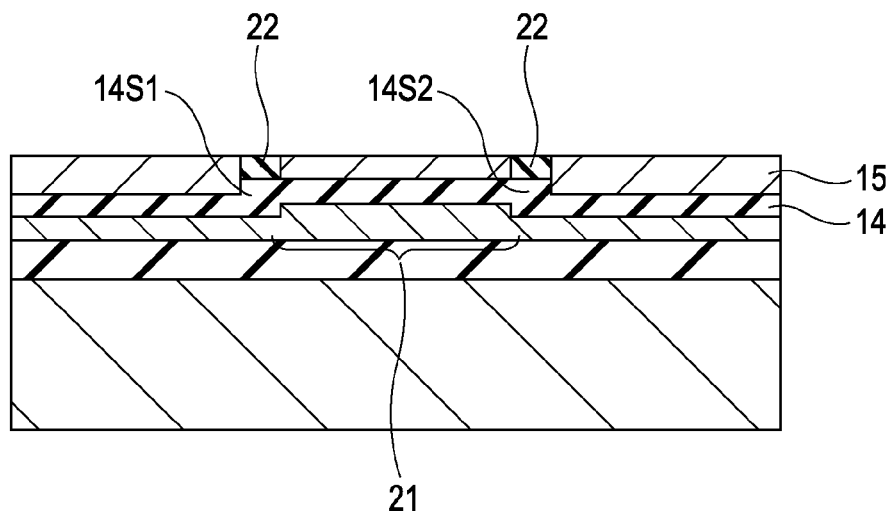
FIG. 7 is a schematic cross-sectional structural view of a structure B for a simulation.

As shown in FIG. 7, from a layout point of view, the insulating film regions 22 were formed in the second semiconductor layer 15 on the step-forming portions 14S1 and 14S2 of the second light confinement layer 14, which were located at the two sides the optical waveguide 21, so that the insulating film regions 22 were overlapped with the two ends thereof, and this structure was called a structure B.

Figure 8:
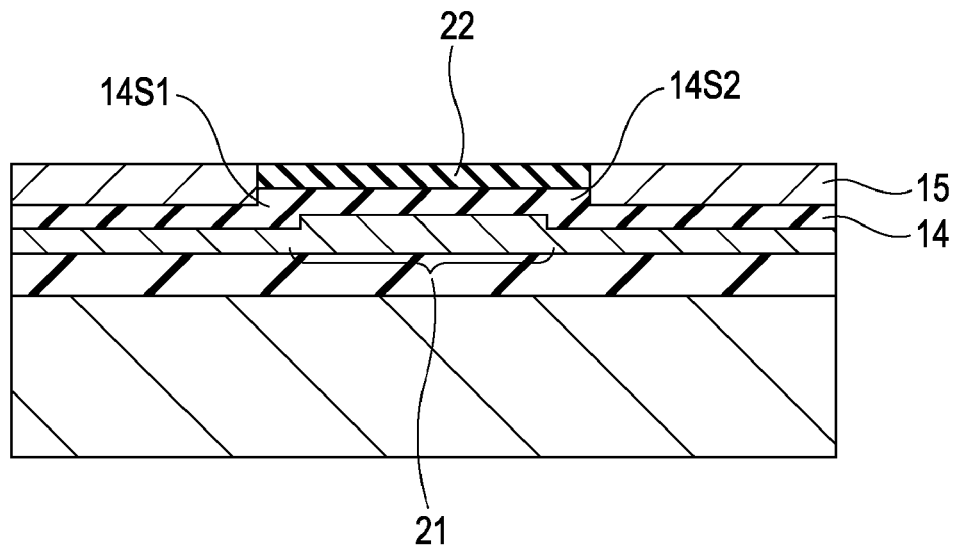
FIG. 8 is a schematic cross-sectional structural view of a structure C for a simulation.

As shown in FIG. 8, from a layout point of view, the insulating film region 22 was formed in the second silicon layer 15 which was on the second light confinement layer 14 on the optical waveguide 21 and on the step-forming portions 14S1 and 14S2, and this structure was called a structure C.

Figure 9:
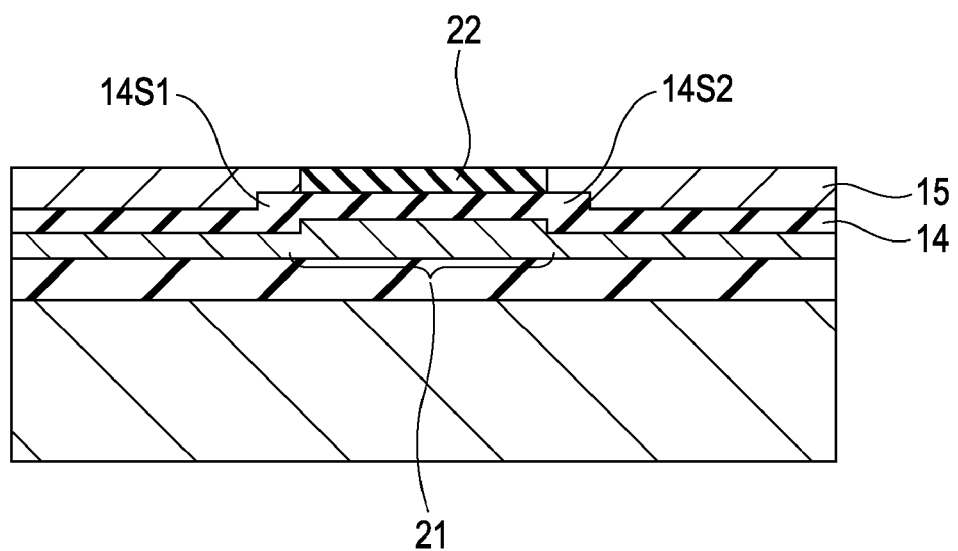
FIG. 9 is a schematic cross-sectional structural view of a structure D for a simulation.

As shown in FIG. 9, from a layout point of view, the insulating film region 22 was formed in the second semiconductor layer 15 which was on the second light confinement layer 14 on the optical waveguide 21, and this structure was called a structure D. In this structure D, the insulating film region 22 was not formed on the step-forming portions 14S1 and 14S2 of the second light confinement layer 14.

Figure 10:
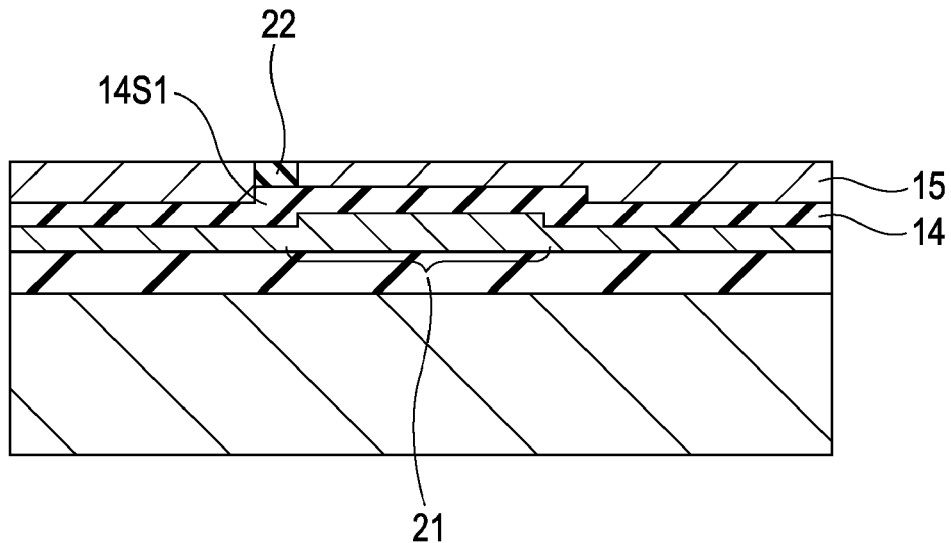
FIG. 10 is a schematic cross-sectional structural view of a structure E for a simulation.

As shown in FIG. 10, from a layout point of view, the insulating film region 22 was formed in the second semiconductor layer 15 on one step-forming portion 14S1 of the second light confinement layer 14, which was located at one side of the optical waveguide 21, so that the insulating film region 22 was overlapped with one end thereof, and in this case, since the optical waveguide 21 was designed to be bent as shown in the above FIG. 2, the insulating film region 22 was formed in the second semiconductor layer 15 and above the inner side of the bent portion 21C of the optical waveguide 21 (see the above FIG. 2). This structure was called a structure E.

Figure 11:
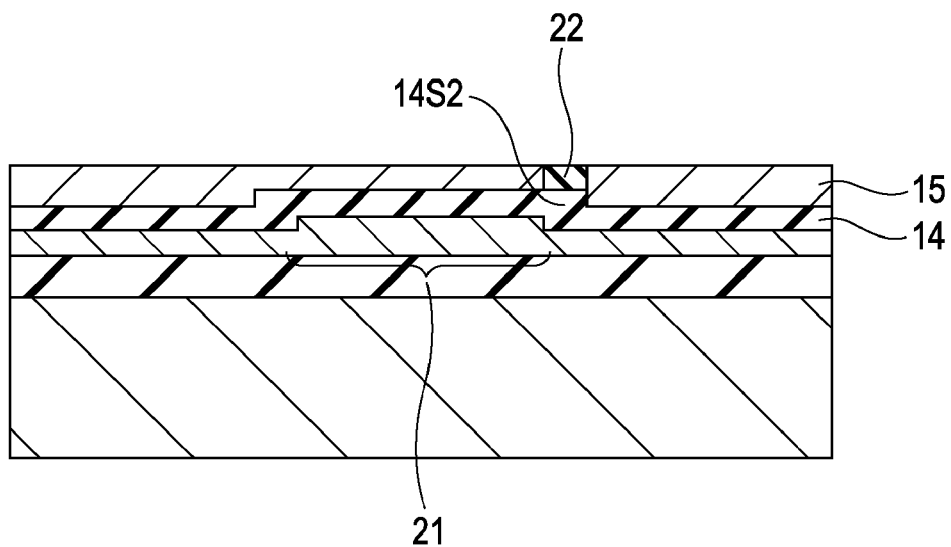
FIG. 11 is a schematic cross-sectional structural view of a structure F for a simulation.
Figure 12:
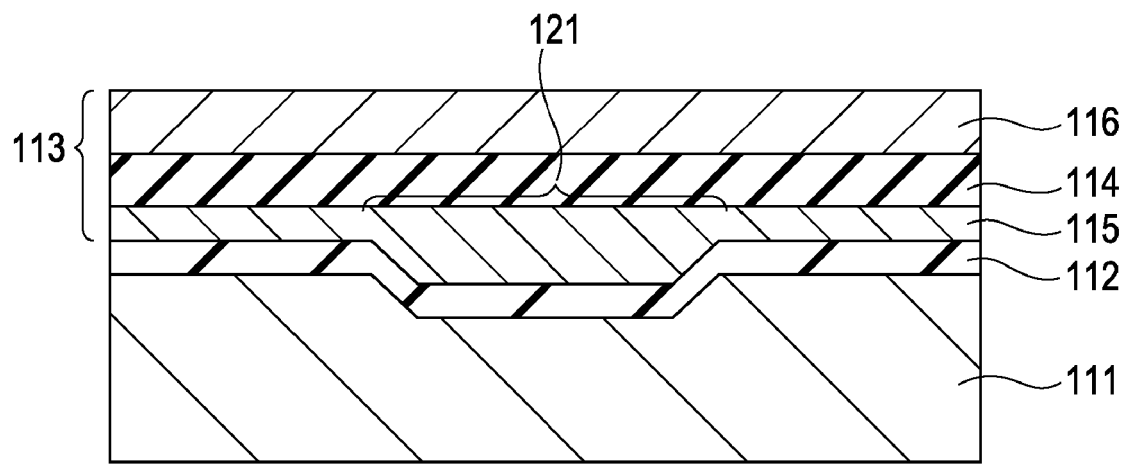
FIG. 12 is a schematic cross-sectional structural view of one example of a related optical semiconductor device.
Figure 13:
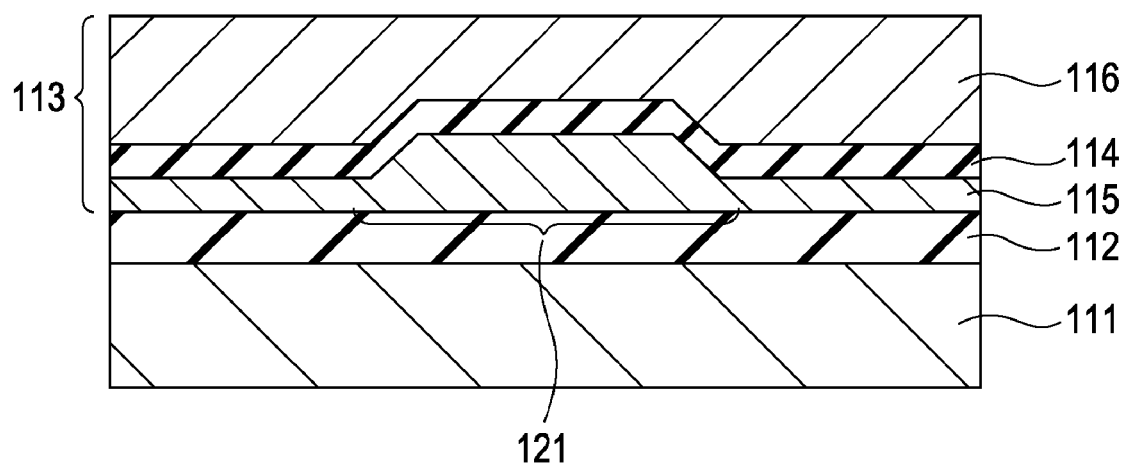
FIG. 13 is a schematic cross-sectional structural view of one example of a related optical semiconductor device.

As shown in FIG. 11, from a layout point of view, the insulating film region 22 was formed in the second semiconductor layer 15 on one step-forming portion 14S2 of the second light confinement layer 14, which was located at one side of the optical waveguide 21, so that the insulating film region 22 was overlapped with one end thereof, and in this case, since the optical waveguide 21 was designed to be bent as shown in the above FIG. 2, the insulating film region 22 was formed in the second semiconductor layer 15 and above the outer side of the bent portion 21C of the optical waveguide 21 (see the above FIG. 2). This structure was called a structure F.

The waveguide losses of the above structures A to F were calculated. In this calculation, waveguide losses L were calculated in the cases in which the curvature radiuses of the bent portion 21C of the optical waveguide 21 were 10 and 20 μm. In this calculation, the curvature radius of the optical waveguide 21 was a curvature radius along a central line (line indicated by the chain line in the above FIG. 2) of the optical waveguide 21. In addition, the above waveguide loss L of the optical waveguide 21 was a value defined such that when light was guided 1 cm long, the waveguide light quantity was represented by exp (−L). When the angle of the optical waveguide was set to 90° using the bent portion having an curvature radius of 20 μm, the waveguide length was 3.14× 20×²⁄₄, that is, approximately 31.4 μm and less than 1 cm; however, in order to facilitate the comparison of the waveguide loss, the loss L described above was used in Table 1. In addition, the calculation results shown in Table 1 were obtained based on the case in which the optical waveguide was bent to the left side with respect to the plane of the figure as shown in the above FIG. 2.

TABLE 1

| Structure | Curvature radius: 20 μm | Curvature radius: 10 μm |
|---|---|---|
| A | 19.45 | 50.78 |
| B | 5.95 | 16.02 |
| C | 8.68 | 22.20 |
| D | 20.78 | 51.08 |
| E | 5.23 | 51.34 |
| F | 5.81 | 15.84 |

In the structure A having no insulating film region 22, the waveguide losses were 19.45 and 50.78 when the curvature radiuses were 20 and 10 μm, respectively. The discussion was carried out based on the values thus obtained.

In the structure F, the most significant effect could be obtained by the formation of the insulating film region 22. In the structure F, the waveguide losses were 5.81 and 15.84 when the curvature radiuses were 20 and 10 μm, respectively. In addition, also in the structure B, the waveguide losses were 5.95 and 16.02 when the curvature radiuses were 20 and 10 μm, respectively, and hence the effect approximately equivalent to that of the structure F was obtained. That is, it was found that the insulating film region 22 was most effectively formed in the second semiconductor layer 15 and above the outer side of the bent portion 21C of the optical waveguide 21.

On the other hand, in the structure D, the waveguide losses were 20.78 and 51.08 when the curvature radiuses were 20 and 10 μm, respectively, and hence it was found that the waveguide loses were increased as compared to those of the structure A. The above results indicated that when the insulating film region 22 was formed to be overlapped with the optical waveguide 21 from a layout point of view, the effect could not be obtained at all.

In addition, in the structure C, since the waveguide losses were 8.86 and 22.20 when the curvature radiuses were 20 and 10 μm, respectively, the formation of the insulating film region 22 showed an effect to some extent; however, it was understood that the part of the insulating film region 22 formed so as to be overlapped with the optical waveguide 21 had a negative effect, and the waveguide loss could not be equivalent to that of the structure F or B.

In addition, in the structure E, the waveguide losses were 5.23 and 51.34 when the curvature radiuses were 20 and 10 μm, respectively. Hence, when the curvature radius was 20 μm, the effect could be obtained by the formation of the insulating film region 22; however, when the curvature radius was 10 μm, the waveguide loss was increased as compared to that of the structure A. Accordingly, in the structure E, it was found that the insulating film region 22 was effectively formed along a portion having a large curvature radius of 20 μm or more. However, it was also found that when the curvature radius was less than 20 μm, the effect was decreased, and when the curvature radius was 10 μm, the effect could not be obtained. That is, it was found that the effect of decreasing the waveguide loss depended on the curvature radius of the bent portion 21C of the optical waveguide 21.

It should be understood by those skilled in the art that various modifications, combinations, sub-combinations and alterations may occur depending on design requirements and other factors insofar as they are within the scope of the appended claims or the equivalents thereof.

What is claimed is:

1. An optical semiconductor device comprising:
    a semiconductor region;
    an optical waveguide provided between a first light confinement layer and a second light confinement layer which are formed in the semiconductor region; and
    at least one insulating film region formed in the semiconductor region and above at least one of an outside and an inside with respect to a central part of a bent portion of the optical waveguide,
    wherein the insulating film region is also used as an isolation region of a MOS device to be formed in the semiconductor region.

2. The optical semiconductor device according to claim 1,
    wherein said at least one insulating film region is formed in the semiconductor region and above at least one of an outside wall and an inside wall of the optical waveguide.

3. The optical semiconductor device according to claim 1,
    wherein the optical waveguide is a ridge-type optical waveguide.

* * * * *